UNITED STATES PATENT OFFICE 2,613,208

TERTIARY AMINOMETHYLBENZENES

John O. Van Hook, Roslyn, and Willard J. Croxall, Bryn Athyn, Pa., assignors to Rohm & Haas Company, Philadelphia, Pa., a corporation of Delaware No Drawing. Application June 29, 1949, Serial No. 102,163

6 Claims. (Cl. 260—247)

This invention deals with tertiary tris(aminomethyl) benzenes and with a method for the preparation of these new compounds.

They are prepared by the trimerization of tertiary propargylamines, which is effected by heating these amines at 50° to 120° C., preferably at 60° to 80° C., in the presence of a nickel carbonyl-phosphine or nickel carbonyl-arsine catalyst. The trimerization reaction is best effected in an inert, organic solvent, such as benzene, toluene, xylene, petroleum ether, or low boiling naphtha.

As catalyst, there is preferably used a nickel carbonyl-triphenyl phosphine catalyst, although other trisubstituted phosphines may be used in place of the triphenyl phosphine with lower yields. There may also be used a nickel carbonyl-triphenyl arsine catalyst. To prepare the catalyst, a solution of nickel carbonyl in an inert, organic solvent and triphenyl phosphine or triphenyl arsine, usually also in such a solvent, are mixed in the proportion of one mole of nickel carbonyl to one to two moles of one of the latter. In place of the phenyl group there may be used an alkylphenyl group or other neutrally substituted phenyl group. Carbon monoxide is slowly evolved and there is formed a catalyst which corresponds in composition to $Ni(CO)_{4-x} \cdot (MAr_3)_x$, when M is an element of group V-B of the periodic table having an atomic weight from 31 to 75, $x$ has a value of one to two, and Ar is a phenyl group. The catalyst is best used in the solution in which it is prepared. The amount of catalyst required is small, varying from 0.25% to 5% of the weight of the tertiary propargylamine. The preferred amount of catalyst used is 1% to 2% of the weight of such amine.

The tertiary propargylamines are available through the reaction of secondary amines, aldehydes or ketones, and acetylene in the presence of a heavy metal of the first or second groups of the usual periodic table. In particular, copper and its salts such as cuprous chloride, copper acetate or formate are effective as catalysts in promoting the condensation of secondary amine, aldehyde or ketone, and acetylene. Temperatures up to 120° C. may be used, depending upon the particular combination of reactants, and the acetylene may be used under pressure. Further details for preparation of tertiary propargylamines will be found in U. S. Patent No. 2,273,141, issued February 17, 1942.

By the procedure described, there are obtained such compounds as

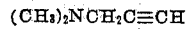
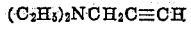
$(C_2H_7)_2NCH_2C\equiv CH$
$(C_4H_9)_2NCH_2C\equiv CH$
$(C_5H_{11})_2NCH_2C\equiv CH$
$(CH_2=CHCH_2)_2NCH_2C\equiv CH$

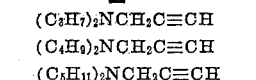

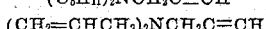

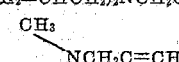

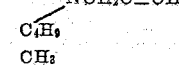

and

These are obtained by the condensation of the corresponding secondary amine, formaldehyde, and acetylene. Other aldehydes may, however, be used and simple ketones may replace the aldehyde. Thus, acetaldehyde, propionaldehyde, butyraldehyde, heptaldehyde, 2-ethyl hexaldehyde, 3,3,5-trimethyl hexaldehyde, benzaldehyde, hexahydrobenzaldehyde, 2-ethylpropylacrolein, acetone, methyl ethyl ketone, and methyl hexyl ketone are effective components in this reaction. Typical of the propargylamines thus prepared are

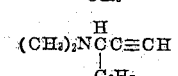

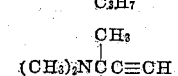

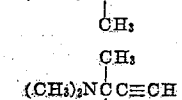

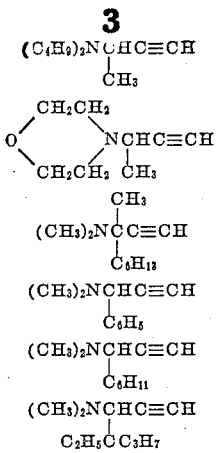

These amines fall within the general formula

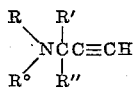

where R and R° are monovalent hydrocarbon groups when taken individually, particularly alkyl groups, and, when taken together, R and R° represent a saturated divalent chain which forms a five- to six-sided heterocycle with the nitrogen, and R' and R'' represent hydrogen or a monovalent hydrocarbon group. Typical monovalent hydrocarbon groups for R and R° are alkyl groups, representative of which are methyl, ethyl, propyl, butyl, amyl, hexyl, heptyl, octyl, and decyl, unsaturated aliphatic hydrocarbon groups, such as allyl, methallyl, and crotyl, cycloaliphatic groups, such as cyclohexyl and methylcyclohexyl, aralkyl groups, such as benzyl, methylbenzyl, and phenylethyl, and aryl groups such as phenyl. It is preferred that the total number of carbon atoms in R and R° be not in excess of twelve. The two groups R and R° may be the same or different. Typical mixed combinations are methyl and benzyl, methyl and cyclohexyl, methyl and butyl, methyl and nonyl, methyl and allyl, methyl and phenyl, and the like. When R and R° together represent a divalent chain which forms a heterocycle with the nitrogen, they thus represent the groups

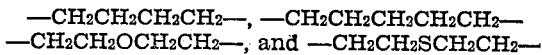

as found in pyrrolidine, piperidine, morpholine and thiamorpholine respectively. It will be recognized that these are all secondary amines and undergo the same reaction with an aldehyde or ketone and acetylene as other secondary amines such as dimethylamine, diisopropylamine, dibutylamine, diamylamine, benzylmethylamine, dicyclohexylamine, methylhexylamine, diallylamine, methylisononylamine, methylaniline, and the like. Furthermore, such amines as diethanolamine can be used for preparation of a propargylamine, thus supplying hydroxyethyl groups as R and R°.

When an aldehyde is used in the preparation of the tertiary propargylamine, at least one of the groups R' and R'' is hydrogen. When formaldehyde is used, both R' and R'' are hydrogen. With other aldehydes, such as acetaldehyde, propaldehyde, butyraldehyde, heptaldehyde and nonaldehyde or benzaldehyde, and alkyl benzaldehydes, such as methylbenzaldehyde or butylbenzaldehyde, and tetrahydrobenzaldehyde or hexahydrobenzaldehyde, one is hydrogen and the other is a hydrocarbon group. In the case where an aliphatic ketone is used as a reactant in the formation of propargylamines, R' and R'' are both monovalent hydrocarbon groups, such as methyl or methyl and ethyl or methyl and hexyl or isopropyl. It is preferred that R' and R'' contain a total of not over eleven carbon atoms.

The tertiary propargylamines trimerize under the influence of a catalyst, $Ni(CO)_{4-x} \cdot (MAr_3)_x$, where M, Ar, and $x$ have the above-defined meanings. Unreacted propargylamine and solvent may be separated and, where the various R substituents are not too large, the product may be distilled under reduced pressure. Ordinary vacuum distillation is usually effective with R substituents up to a total of about fifteen carbon atoms. Short path and flash distillation methods may be applied where somewhat larger groups occur. With still larger R substituents it may be necessary to treat the product as residue by such known methods as charcoaling and extraction.

The products obtained are of the general formula

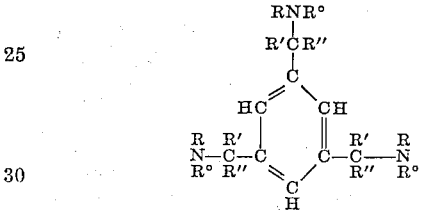

where R, R°, R', and R'' have the meanings described above. They are useful in bactericidal and fungicidal compositions, as basic reagents for overcoming acidity, as catalysts, as inhibitors against oxidation and corrosion, serving as additives, for example, in oils and greases. They form salts with acids and quaternary ammonium compounds with alkylating agents and as such find use for wetting, emulsifying, and dispersing. Reaction by addition can occur with alcohols, mercaptans, and other compounds with active hydrogen atoms. Some of the above amines have marked insecticidal action.

Preparation of typical compounds of this invention is illustrated in the following examples.

EXAMPLE 1

*1,3,5-tris(dimethylaminomethyl)benzene*

A mixture of 415 g. of 3-dimethylamino-1-propyne, 500 ml. of petroleum ether boiling between 35° and 70° C., and 10 g. of a complex catalyst prepared from one part (by moles) of nickel carbonyl and two parts of triphenyl phosphine was heated to 57° C., at which temperature the reaction became exothermic. The temperature was maintained at 57°–58° C. by external cooling for one hour and then by the application of external heat for an additional three hours. The mixture was filtered to remove about two grams of a black tar and was then distilled. There was obtained 298 g. of a fraction which distilled between 51° and 67° C. and consisted of petroleum ether and 35 g. of unreacted 3-dimethylamino-1-propyne. On continued distillation there was obtained 268 g. (74%) of 1,3,5-tris(dimethylaminomethyl)benzene which distilled at 91°–175° C./1–5 mm. The last portion of the distillate was obtained under forcing conditions and was accompanied by decomposition. The residue, an intractable tar, weighed 92 g. On redistillation the product boiled at 98°–103° C./0.1 mm. and had a refractive index, $n_D^{20}$, of 1.5058, a density, $d_{20}^{20}$, of 0.916, and a molecular refraction, $MR_D$, of 80.91.

On analysis, the product was found to have a carbon content of 71.83%, a hydrogen content of 10.99%, a nitrogen content of 16.42%, an equivalent weight, as determined by titration with acid to brom phenol blue indicator end point, of 83.9, and a molecular weight of 246 as determined by an ebulliometric method in acetone. The theoretical values for the product 1,3,5-tris(dimethylaminomethyl)benzene ($C_{15}H_{27}N_3$) are: Molecular refraction, $MR_D$, 79.69; carbon content, 72.25%; hydrogen content, 10.90%; nitrogen content, 16.85%; equivalent weight, 83.1; and molecular weight, 249.3. Alkaline permanganate oxidation of the product produced trimesic acid which was identified by comparison of its ethyl ester with an authentic sample.

EXAMPLE 2

*1,3,5-tris(diethylaminomethyl)benzene*

A mixture of 14 grams (0.125 mole) of 3-diethylamino-1-propyne, 25 ml. of hexane, and 0.3 gram of a complex catalyst prepared from one part of nickel carbonyl and two parts of triphenyl phosphine was heated under reflux for four hours while the pot temperature was maintained between 74° and 79° C. The mixture was cooled and filtered to remove one gram of tar. The filtrate was distilled to produce 10 grams of hexane, having a boiling point of 60°–61° C., and 7 grams (50%) of 1,3,5-tris(diethylaminomethyl)benzene which distilled at 110°–145° C./1 mm. and had a refractive index, $n_D^{20}$, of 1.5031. On redistillation the product distilled between 135°–145° C./0.1 mm. and had a refractive index, $n_D^{20}$, of 1.5013 and a density, $d_{20}^{20}$, of 0.892, and a molecular refraction, $MR_D$, of 110.2. On analysis, the product was found to have an equivalent weight of 112.5 as determined by titration to brom phenol blue indicator, a carbon content of 75.53%, a hydrogen content of 11.71%, and a nitrogen content of 12.51%. The product, 1,3,5-tris(diethylaminomethyl)benzene ($C_{21}H_{39}N_3$) has a theoretical value for molecular refraction, ($MR_D$), of 107.4; for equivalent weight, of 111; for carbon content, of 75.60%; for hydrogen content, of 11.81%; and for nitrogen content, of 12.59%.

EXAMPLE 3

*1,3,5-tris(dibutylaminomethyl)benzene*

A mixture of 44 g. (0.25 mole) of 3-dibutylamino-1-propyne, 100 ml. of hexane, and 1 gram of a complex prepared from one part of nickel carbonyl and two parts of triphenyl phosphine was heated under reflux for four hours while the pot temperature was maintained between 70° and 76° C. The mixture was then cooled and filtered to remove one gram of tar. The filtrate was distilled to obtain 59 g. of hexane which distilled at 60°–64° C. and 13.5 g. (35%) of 1,3,5-(dibutylaminomethyl)benzene which distilled at 168°–270° C./0.4–0.8 mm. The trap collected 5 grams of unreacted 3-dibutylamino-1-propyne. The product redistilled at 200°–225° C./0.25 mm. and had a refractive index, $n_D^{20}$, of 1.4907, a density, $d_{20}^{20}$, of 0.885, and a molecular refraction, $MR_D$, of 164.1, and on analysis was found to have a nitrogen content of 8.13%. The theoretical values for the product 1,3,5-tris(dibutylaminomethyl)benzene ($C_{33}H_{63}N_3$) are: Molecular refraction, $MR_D$, 162.8 and nitrogen content, 8.36%.

EXAMPLE 4

*1,3,5-tris(methylnonylaminomethyl)benzene*

A mixture of 45 g. (0.23 mole) of 3-(methylnonylamino)-1-propyne, 100 ml. of hexane, and one gram of a complex catalyst prepared from one part of nickel carbonyl and two parts of triphenyl phosphine was heated under reflux for four hours while the pot temperature was held at 70°–75° C. The mixture was then cooled and filtered to remove one gram of tar. The filtrate was distilled to produce 56 g. of hexane which distilled at 60°–68° C. and 9 g. (23%) of 1,3,5-tris(methylnonylaminomethyl)benzene which distilled between 150° and 260° C./1 mm. The trap collected 6 g. of unreacted 3-methylnonylamino-1-propyne. The product redistilled at 200°–239° C./0.3 mm., had a refractive index, $n_D^{20}$, of 1.4862, a density, $d_{20}^{20}$, of 0.875, a molecular refraction, $MR_D$, of 192.6, and on analysis was found to have a nitrogen content of 7.05%. The theoretical values for this product, 1,3,5-tris-(methylnonylaminomethyl)benzene ($C_{39}H_{75}N_3$) are: Molecular refraction, $MR_D$, 190.5 and nitrogen content, 7.17%.

EXAMPLE 5

*1,3,5-tris(N-morpholinomethyl)benzene*

A mixture of 63 g. (0.5 mole) of 3-(N-morpholino)-1-propyne, 200 ml. of hexane, and 0.5 g. of a complex catalyst prepared from one part of nickel carbonyl and two parts of triphenyl phosphine was heated under reflux for four hours while the pot temperature was held at 71°–75° C. The mixture was cooled and filtered to remove one gram of tar. The residue was washed with 150 ml. of water. The undissolved hexane amounted to 194 ml. The aqueous layer was saturated with potassium carbonate. The resulting organic layer was dried over anhydrous potassium carbonate and distilled. There was obtained 14 g. of unreacted 3-(N-morpholino)-1-propyne which distilled at 50°–142° C./0.3 mm. and had a refractive index, $n_D^{20}$, of 1.4750 and 13 g. (26%) of 1,3,5-tris(N-morpholinomethyl)benzene which distilled at 135°–240° C./1 mm. and had a refractive index, $n_D^{20}$, of 1.5379. The product redistilled at 229°–226° C./0.5 mm. and had a refractive index, $n_D^{20}$, of 1.5440, a density, $d_{20}^{20}$, of 1.112, and a molecular refraction, $MR_D$, of 106.7. On analysis, the product proved to have a nitrogen content of 10.99%. The theoretical values for this product, 1,3,5-tris(N-morpholinomethyl)benzene ($C_{21}H_{33}N_3O_3$) are: Molecular refraction, $MR_D$, 105.7 and nitrogen content, 11.19%.

EXAMPLE 6

*1,3,5-tris[1-(N-morpholino)-3,3,5-trimethylhexyl]benzene*

A mixture of 48 g. (0.2 mole) of 3-(N-morpholino)-5,7,7-trimethyl-1-octyne, 100 ml. of benzene, and 1 gram of a complex prepared from one part of nickel carbonyl and two parts of triphenyl phosphine was treated under reflux for seven hours while the pot temperature was maintained at 85°–90° C. The mixture then was cooled and filtered to remove one gram of tar. The filtrate was distilled to obtain 83 g. of benzene, 17 g. of unreacted octyne, and 20.5 g. of 1,3,5-tris[1-(N-morpholino) - 3,3,5 - trimethylhexyl]benzene (64%) which distilled between 200° and 340° C./1 mm. The product was redistilled at 260°–309° C./0.4 mm., had a refractive index, $n_D^{20}$, of 1.5071 and on analysis was found to have a nitrogen content of 5.30%. The theoretical nitrogen content of this product, 1,3,5-tris[1-(N-morpholino)-3,3,5-trimethylhexyl]benzene ($C_{45}H_{81}O_3N_3$), is 5.90%.

EXAMPLE 7

1,3,5-tris(1-N-morpholino-1-phenylmethyl)-benzene

A mixture of 40 g. (0.2 mole) of 3-N-morpholino-3-phenylpropyne-1, 100 g. of benzene, and one gram of a complex catalyst prepared from one part of nickel carbonyl and two parts of triphenyl phosphine was heated under reflux for four hours at a pot temperature of 85°–88° C. This mixture was cooled, filtered, and distilled. A portion of the residue remaining after removal of benzene was distilled to give a product corresponding in composition to 1,3,5-tris(1-N-morpholino - 1 - phenylmethyl)benzene. It distilled at 300°–360° C./1.4 mm.

EXAMPLE 8

1,3,5-tris(dimethylaminomethyl)benzene

A nickel carbonyl-triphenyl phosphine (1:1) complex, prepared by adding 0.25 g. of triphenyl phosphine in 10 g. of benzene to 0.3 cc. of nickel carbonyl in 10 g. of benzene, was diluted with 200 ml. of petroleum naphtha having a boiling range of 60°–71° C. and 83 g. (1.0 mole) of 3-dimethylamino-1-propyne. At the start the reaction was exothermic and required cooling. The mixture was heated under reflux for four hours, cooled, and filtered to remove about one gram of tar. The filtrate was distilled. There was obtained a mixture of naphtha, benzene, and 40 g. of unreacted propyne which distilled at 63°–78° C. and 29 g. of 1,3,5-tris(dimethylaminomethyl)benzene (a yield of 60%) which distilled at 114°–155° C./1.0 mm. and had a refractive index, $n_D^{20}$, of 1.5102. The residue weighed seven grams.

EXAMPLE 9

1,3,5-tris(dimethylaminomethyl)benzene

A nickel carbonyl-triphenyl arsine (1:2) complex in benzene solution was prepared by adding 12.24 g. (0.04 mole) of triphenyl arsine in 25 ml. of benzene to 0.02 mole of nickel carbonyl in 25 ml. of benzene. Two ml. of the resulting solution was used to catalyze the trimerization of 16.6 g. (0.2 mole) of 3-dimethylamino-1-propyne in 25 g. of benzene in a manner described above. There was obtained on distillation benzene and 10.5 g. of unreacted propyne which distilled at 79°–81° C. and 1.5 g. of 1,3,5-tris(dimethylaminomethyl)-benzene which distilled at 114°–130° C./0.5 mm. and had a refractive index, $n_D^{20}$, of 1.5096.

We claim:
1. Compounds of the formula

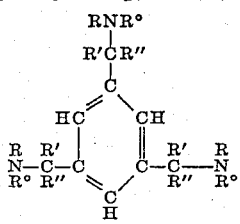

where R and R° are monovalent hydrocarbon groups when taken individually having a total of not over twelve carbon atoms and when taken together form a saturated divalent chain from the class consisting of $-CH_2CH_2CH_2CH_2-$, $-CH_2CH_2CH_2CH_2CH_2-$, $-CH_2CH_2OCH_2CH_2-$, and $-CH_2CH_2SCH_2CH_2-$, said chain forming a five- to six-sided heterocycle with the nitrogen, and R' and R'' represent a member of the class consisting of hydrogen and monovalent hydrocarbon groups containing not over eleven carbon atoms.

2. A compound of the formula

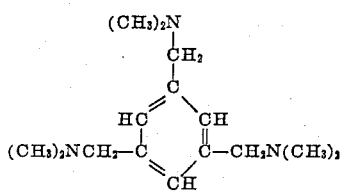

3. The compound 1,3,5 - tris(N - morpholinomethyl)benzene.
4. The compound 1,3,5-tris(1-N-morpholino-3,5,5-trimethylhexyl)benzene.
5. The compound 1,3,5-tris(1-N-morpholino-1-phenylmethyl)benzene.
6. The compound 1,3,5-tris(diethylaminoethyl)benzene.

JOHN O. VAN HOOK.
WILLARD J. CROXALL.

REFERENCES CITED

The following references are of record in the file of this patent:

UNITED STATES PATENTS

| Number | Name | Date |
|---|---|---|
| 2,220,834 | Bruson et al. | Nov. 5, 1940 |
| 2,273,141 | Reppe et al. | Feb. 17, 1942 |

OTHER REFERENCES

Reppe et al.: Annalen, vol. 560, pages 104–116 (1948).

Copenhaver et al.: "Acetylene and Carbon Monoxide Chemistry," Reinhold Publishing Co., New York, N. Y., 1949, page 169.